(12) United States Patent
Liao

(10) Patent No.: US 8,259,219 B2
(45) Date of Patent: Sep. 4, 2012

(54) DETECTION SYSTEM FOR AUTOFOCUS FUNCTION OF IMAGE CAPTURE DEVICE AND CONTROL METHOD THEREOF

(75) Inventor: Feng-Ching Liao, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 681 days.

(21) Appl. No.: 12/340,747

(22) Filed: Dec. 22, 2008

(65) Prior Publication Data

US 2010/0002125 A1    Jan. 7, 2010

(30) Foreign Application Priority Data

Jul. 3, 2008    (CN) .......................... 2008 1 0302519

(51) Int. Cl.
*H04N 5/238* (2006.01)
(52) U.S. Cl. .................. 348/364; 348/345; 348/362
(58) Field of Classification Search .................. 348/364, 348/362, 345, 349, 366
See application file for complete search history.

(56) References Cited

U.S. PATENT DOCUMENTS

| | | | |
|---|---|---|---|
| 5,049,916 A | | 9/1991 | O'Such et al. |
| 2006/0082675 A1* | | 4/2006 | McGarvey et al. ........... 348/362 |
| 2006/0115165 A1 | | 6/2006 | Chao et al. |
| 2006/0158532 A1 | | 7/2006 | Ayaki et al. |
| 2006/0269261 A1* | | 11/2006 | Wernersson .................... 396/55 |
| 2007/0025718 A1* | | 2/2007 | Mori et al. ..................... 396/155 |
| 2008/0062276 A1 | | 3/2008 | Hirai et al. |
| 2008/0297613 A1* | | 12/2008 | Takahashi et al. .......... 348/221.1 |
| 2009/0244301 A1* | | 10/2009 | Border et al. ............ 348/208.99 |
| 2010/0214440 A1* | | 8/2010 | Hirose ........................ 348/229.1 |

FOREIGN PATENT DOCUMENTS

| | | | |
|---|---|---|---|
| JP | 2003-262788 | * | 9/2003 |
| JP | 2003262788 A | | 9/2003 |
| KR | 20040085592 | | 10/2004 |
| TW | 479359 | | 3/2002 |

OTHER PUBLICATIONS

Douglas A. Kerr, "APEX—The Additive System of Photographic Exposure" Issue 7; Aug. 4, 2007.

* cited by examiner

*Primary Examiner* — Nelson D. Hernández Hernández
(74) *Attorney, Agent, or Firm* — Altis Law Group, Inc.

(57) ABSTRACT

A detection system for an image capture device includes an image detecting unit, a calculation unit, a selection unit and a switching unit. The image detecting unit provides a plurality of focus modes suitable for different ambient light conditions, and acquires image parameters. The calculation unit determines exposure time suitable for the current ambient light conditions based on the acquired parameters. The selection unit selects a suitable detection mode based on the determined exposure time. The switching unit switches the image capture device to the selected suitable detection mode.

3 Claims, 2 Drawing Sheets

DETECTION SYSTEM FOR AUTOFOCUS FUNCTION OF IMAGE CAPTURE DEVICE AND CONTROL METHOD THEREOF

BACKGROUND

1. Technical Field

The disclosure relates to a detection system for an autofocus function of an image capture device and a control method thereof.

2. Description of the Related Art

Image capture devices such as digital still cameras and digital video cameras utilize various detection systems when acquiring images. Image quality is influenced by detection modes of the systems, normally preset by manufacturers. When acquiring images, a suitable detection mode is selected according to current parameters of the target image. Such selection is inconvenient and typically requires expert skills.

Therefore, it is desirable to provide a detection system for an autofocus function of an image capture device and a control method which can overcome the described limitations.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the detection system for the autofocus function of the image capture device and the control method thereof. Moreover, in the drawings, like reference numerals designate corresponding parts throughout the several views.

DETAILED DESCRIPTION OF THE EMBODIMENTS

Embodiments of the detection system for the autofocus function of an image capture device and control method thereof are described in detail here with reference to the drawings.

Figure 1:
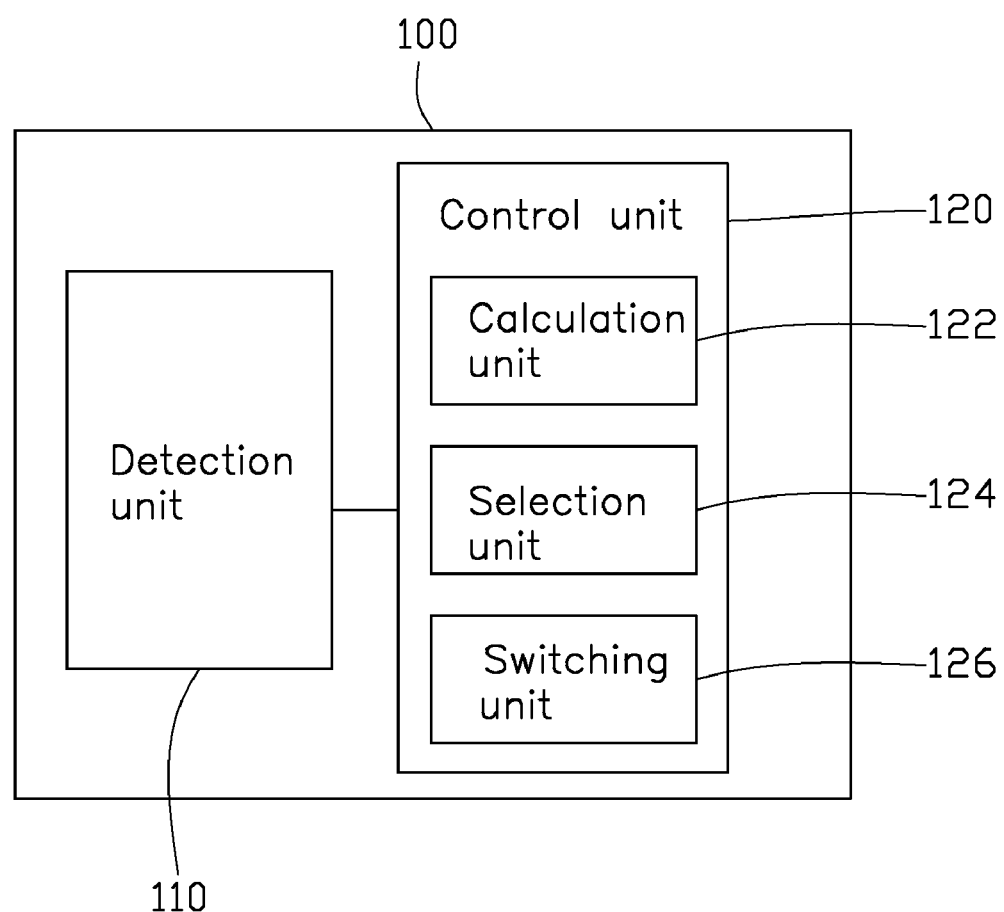
FIG. 1 is a block diagram of a detection system, according to an embodiment of the disclosure.

As shown in FIG. 1, a detection system 100 is applied in an image capture device 200 such as a digital still camera, and includes a detection unit 110 and a control unit 120 electrically coupled to the detection unit 110.

The detection unit 110 is configured for capturing images and provides a plurality of detection modes suitable for the image capture device 200 to perform the autofocus function under different ambient light conditions, and is configured to acquire image parameters, such as a brightness value of the images. For example, the detection unit 110 can be a charge-coupled device (CCD) sensor.

The detection unit 110 provides parameters affecting the autofocus function of the image capture device 200, such as a resolution, a frame rate, and a light sensitivity, where the resolution represents scan lines of the detection unit 110; the frame rate represents a frequency at which the detection unit 110 produces unique consecutive images called frames and the frequency is expressed in frames per second (fps); and the light sensitivity represents an efficiency of conversion from light into electric signals to form image signals by the detection unit 110 when capturing the images.

In this embodiment, the detection modes include a first detection mode, a second detection mode, and a third detection mode. In each of the detection modes, a corresponding exposure time value Tv is used in the autofocus function of the image capture device 200 (see below). For example, in the first detection mode, the detection unit 110 may provide a 3264×272 resolution, a frame rate ranging from 30 to 60 fps, and a low level light sensitivity. In the second detection mode, the detection unit 110 may provide a 1088×816 resolution, a 30 fps frame rate, and a high level light sensitivity. In the third mode, the detection unit 110 may provide a 1088×272 resolution, a 60 fps frame rate, and a medium level light sensitivity. As mentioned, each group of these three parameters: the resolution, the frame rate, and the light sensitivity constitutes a setting of the image capture device 200 that affects the autofocus function of the image capture device 200.

A suitable detection mode is selected from the plurality of detection modes, based upon an exposure time value Tv, which is determined to be suitable for the image capture device 200 to perform the autofocus function under current ambient light conditions. For example, when the ambient light conditions are brighter, a shorter exposure time value Tv is determined and adopted to avoid overexposure and accordingly the third detection mode having the high frame rate (allowed by the shorter Tv) is selected for increasing focus velocity. In other words, when the ambient light conditions are darker, a longer exposure time value Tv is determined to be suitable to obtain adequate exposure and accordingly the second detection mode with the high light sensitivity is selected to achieve the adequate exposure.

The control unit 120 includes a calculation unit 122, a selection unit 124, and a switching unit 126.

The calculation unit 122 is configured to determine the exposure time value Tv suitable for the image capture device 200 to perform the autofocus function under current ambient light conditions using the formula:

$$Av+Tv=Bv+Sv$$

wherein Av represents an aperture value of the image capture device 200, Sv represents an automatic gain control (Agc) value of the image capture device 200, and Bv represents a brightness value of the images. In detail, Av and Sv are read from the image capture device 200, and Bv is provided from the detection unit 110, that is, Bv is captured by the detection unit 110.

The selection unit 124 selects an appropriate detection mode based on the determined Tv.

The switching unit 126 switches the detection unit 110 to the selected detection mode.

Figure 2:
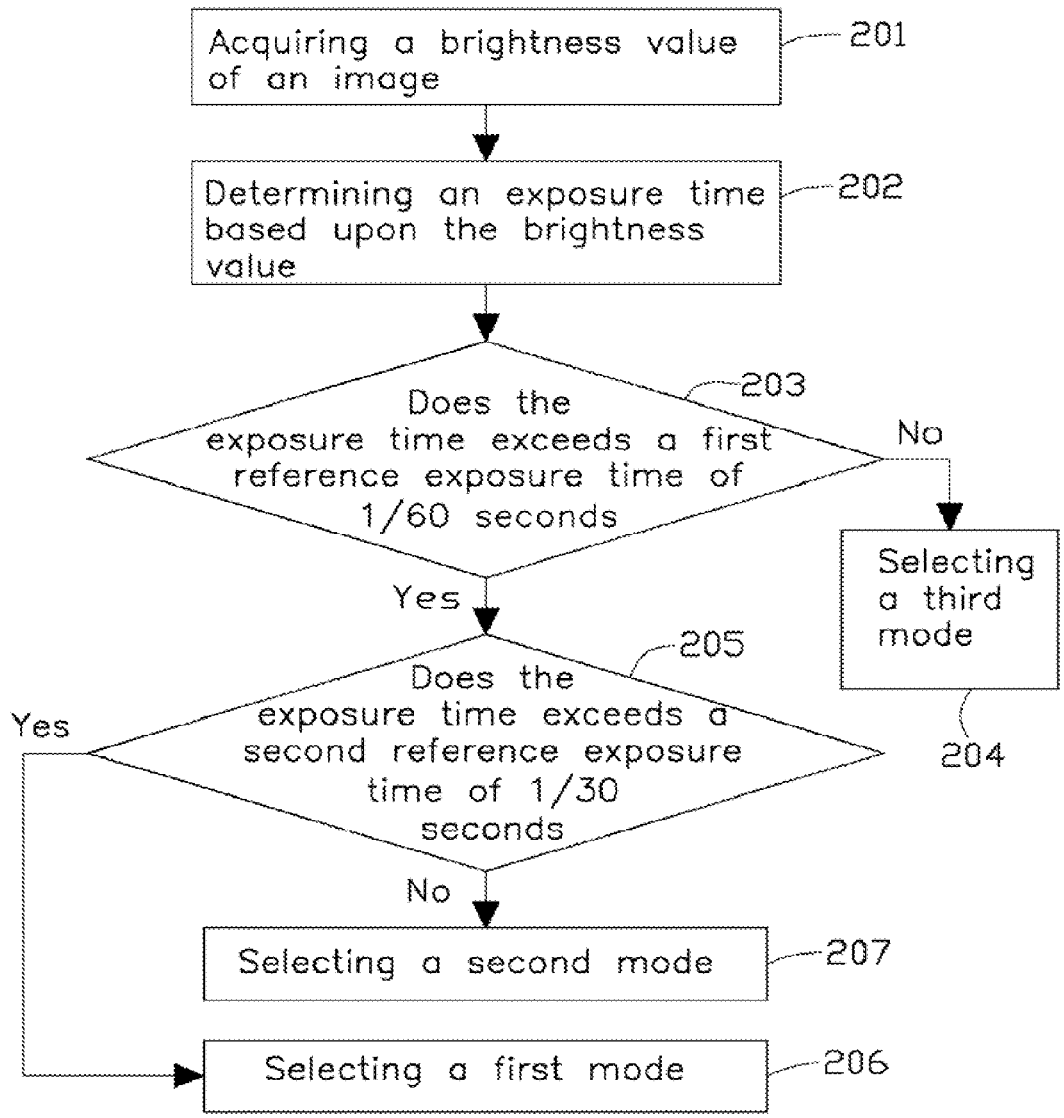
FIG. 2 is a flowchart of a control method for a detection system according to an embodiment of the disclosure.

FIG. 2 shows a control method based on an embodiment which may be performed by, for example, a detection system 100 of FIG. 1.

In step 201, image parameters, such as the brightness value Bv of the images, are acquired by a detection unit 110. The detection unit 110 provides first, second, and third detection modes, each suitable for the image capture device 200 to perform the autofocus function under different ambient light conditions.

In step 202, the exposure time value Tv is determined. The determination is performed by a calculation unit 122 based on Av, Sv and Bv.

In step 203, whether or not the exposure time value Tv exceeds a first reference exposure time of 1/60 seconds is determined. If the exposure time value Tv does not exceed the first exposure time of 1/60 seconds, step 204 is employed. If the exposure time value Tv exceeds the first exposure time of 1/60 seconds, step 205 is employed.

In step 204, the third detection mode is selected, in which the frame rate equals 60 fps.

In step 205, whether or not the exposure time value Tv exceeds a second reference exposure time of 1/30 seconds is determined. If the exposure time value Tv does not exceed the second reference exposure time of 1/30 seconds, step 207 is employed. If the exposure time value Tv exceeds the second reference exposure time of 1/30 seconds, step 206 is employed.

In step 206, the first detection mode is selected, in which the frame rate is from 30 to 60 fps.

In step 207, the second detection mode is selected, in which the frame rate equals 30 fps.

The detection system 100 automatically detects the exposure time value Tv and switches the image capture device 200 to a corresponding suitable detection mode according to the current ambient light conditions for the autofocus function. It is convenient for automatically detecting the exposure time value Tv and switching the image capture device 200 for the autofocus function to the suitable detection mode without manual determination.

While the disclosure has been described by way of example and in terms of preferred embodiment, it is to be understood that the disclosure is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A detection system for an autofocus function of an image capture device, the detection system comprising
    a detection unit configured for capturing an image, the detection unit providing a plurality of different detection modes suitable for the image capture device to perform the autofocus function under different ambient light conditions, the detection unit being capable of acquiring a brightness value of the image;
    a calculation unit capable of determining an exposure time suitable for the image capture device to perform the autofocus function under current ambient light conditions, based on the brightness value;
    a selection unit capable of selecting a suitable detection mode from the plurality of detection modes based on the exposure time; and a switching unit capable of switching the image capture device to the suitable detection mode to suitably perform the autofocus function;
    wherein the determination of the exposure time is based on the formula:

$$Av+Tv=Bv+Sv$$

wherein Av represents an aperture value of the image capture device, Tv represents the value of the exposure time, By represents the brightness value, and Sv represents an automatic gain. control value of the image capture device; and
    wherein the plurality of detection modes comprises:
    a first detection mode using a first resolution of 3264 by 272, a first frame rate of 30 to 60 fps, and a low light sensitivity;
    a second detection mode using a second resolution of 1088 by 816, a second frame rate of 30 fps, and a high light sensitivity; and
    a third detection mode using a third resolution of 1088 by 272 a third frame rate of 60 fps, and medium light sensitivity.

2. A control method for a detection system applied to an image capture device, the detection system comprising a detection unit, the detection unit being configured for capturing an image and providing a plurality of detection modes suitable for the image capture device to perform an autofocus function under different ambient light conditions, the plurality of detection modes comprising a first detection mode, the control method comprising:
    acquiring a brightness value of the image;
    calculating an exposure time suitable for the image capture device to perform the autofocus function under ambient light conditions, based on the brightness value;
    determining whether or not the exposure time exceeds a first predetermined value; and
    switching the image capture device to a third detection mode that has a high frame rate if the exposure time does not exceed the first predetermined value;
    determining whether or not the exposure time exceeds a second predetermined value that is higher than the first predetermined value if the exposure time exceeds the first predetermined value:
    switching the image capture device to a second detection mode that has a low frame rate if the exposure time does not exceed the second , predetermined value and
    switching the image capture device to a first detection mode that has a medium frame rate if the exposure time exceeds the second predetermined value.

3. A control method for a detection system, comprising:
    providing an image capture device containing the detection system, the detection system comprising a detection unit, the detection unit being configured for capturing an image and capable of providing a plurality of detection modes suitable for the image capture device to perform an autofocus function under different ambient light conditions, each of the plurality of detection modes being associated with a corresponding exposure time;
    acquiring a brightness value of the image;
    calculating an exposure time suitable for the image capture device to perform the autofocus function under current ambient light conditions, based on the brightness value;
    determining Whether or not the exposure time exceeds a first predetermined value; and
    switching the image capture device to a third detection mode that has a high frame rate if the exposure time does not exceed the first predetermined value;
    determining whether or not the exposure time exceeds a second predetermined value that is higher than the first predetermined value if the exposure time exceeds the first predetermined value;
    switching the image capture device to a second detection mode that has a low frame rate if the exposure time does not exceed the second predetermined value; and
    switching the image capture device to a first detection mode that has a medium frame rate if the exposure time exceeds the second predetermined value.

* * * * *